United States Patent [19]

Stackpool

[11] 4,396,688
[45] Aug. 2, 1983

[54] ELECTROCHEMICAL CELLS CONTAINING LIQUID SODIUM AS THE ANODIC MATERIAL

[75] Inventor: Francis M. Stackpool, Frodsham, England

[73] Assignee: Chloride Silent Power Limited, London, England

[21] Appl. No.: 330,043

[22] Filed: Dec. 11, 1981

[30] Foreign Application Priority Data

Dec. 15, 1980 [GB] United Kingdom ................. 8040066

[51] Int. Cl.³ .............................................. H01M 10/39
[52] U.S. Cl. ................................................ 429/104
[58] Field of Search ..................................... 429/104

[56] References Cited

U.S. PATENT DOCUMENTS

| | | | |
|---|---|---|---|
| 4,024,321 | 5/1977 | Tilley | 429/104 |
| 4,038,464 | 7/1977 | Baukal et al. | 429/104 |
| 4,048,391 | 9/1977 | Tilley et al. | 429/104 |
| 4,055,710 | 10/1977 | May et al. | 429/104 |
| 4,102,042 | 7/1978 | Weiner | 429/104 |
| 4,226,923 | 10/1980 | Mikkor | 429/104 |

Primary Examiner—Donald L. Walton
Attorney, Agent, or Firm—Beveridge, DeGrandi, Kline

[57] ABSTRACT

In a sodium sulphur cell in which a cylindrical electrolyte tube separates sodium from sulphur/sodium polysulphides, with the sodium lying in an annular region between the electrolyte tube and an anode current collector, the sodium annulus contains zircon sand forming a filler and also constituting a capillary means drawing liquid sodium from a sodium reservoir to lie over the surface of the electrolyte tube.

14 Claims, 2 Drawing Figures

ELECTROCHEMICAL CELLS CONTAINING LIQUID SODIUM AS THE ANODIC MATERIAL

BACKGROUND OF THE INVENTION

1. Field of the Invention

This invention relates to electrochemical cells containing liquid sodium as the anodic material.

2. Prior Art

In sodium-sulphur cells, liquid sodium forming the anodic material is separated by a solid electrolyte, usually beta-alumina, from sulphur/sodium polysulphides constituting the cathodic reactant. The anodic and cathodic materials, if allowed to mix, as would occur if the electrolyte was breached, react exothermically. It is therefore the practice in such cells to maintain only a small quantity of sodium over the anodic surface of the electrolyte element, gas pressure and/or a capillary or wicking system being used to force or draw up sodium from a reservoir into the anodic region adjacent the electrolyte surface. In a tubular cell, the anodic region is an annular region between one surface of the electrolyte tube and an anodic current collector; the sodium may be inside or outside the electrolyte tube but conveniently the anode current collector is a metal housing surrounding the electrolyte tube. To reduce the quantity of sodium in this annular region, it is a common practice to fill this region with carbon powder or small glass beads or alumina, these materials being chemically and electrochemically inert with respect to the sodium and the electrolyte material. Reference may be made to U.S. Pat. No. 4,048,391 which refers to the possible use of glass beads, steel shot, ceramic spheres or powder, silica carbide granules and graphite powder or spheres.

These materials used so far have various drawbacks. The desirable requirements for such a filler are that (a) it should be wetted by sodium at 150° C.,
(b) it should not outgas at the filling or operating temperatures,
(c) it should be resistant to corrosion by liquid sodium,
(d) it should have a high packing density,
(e) it should not contaminate the sodium electrode,
(f) it should have a particle size distribution which will adequately fill the anodic region without individual particles bridging between the electrolyte and the current collector or housing,
(g) it should not react exothermically with sulphur or sodium polysulphides, and
(h) it should have a high heat capacity per unit volume.

As stated above, graphite or carbon particles or glass spheres have been most commonly employed heretofore but outgassing problems occur with both these materials. With graphite or carbon particles, poor wetting by liquid sodium at 150° C. has been found such as to cause problems in filling the cell with sodium.

SUMMARY OF THE INVENTION

It is an object of the present invention to provide an improved filler material which more closely meets the desired requirements listed above.

According to the present invention, in an electrochemical cell having a solid electrolyte separating a cathodic reactant from liquid sodium in an anodic region adjacent a surface of the electrolyte, said anodic region contains zircon sand.

Zircon sand is a naturally occurring material which consists essentially of zirconium orthosilicate. A typical chemical analysis of such material is as follows:

| | |
|---|---|
| $ZrO_2$ (includes $HfO_2$) | 66.1–66.4% |
| $TiO_2$ | 0.13–0.18% |
| $Fe_2O_3$ | 0.10–0.13% |
| $Al_2O_3$ | 0.15–0.20% |
| $SiO_2$ (total)* | 32.4–32.7% |
| $P_2O_5$ | 0.05–0.07% |
| L.O.I. ... (900° C.) | 0.2–0.3% |

*Includes Free Quartz.

It has been found that zircon sand substantially meets most of the requirements (a) to (h) above.

Zircon sand is to be distinguished from zircon beads which are spherical particles of 0.5 to 0.8 mm diameter formed of fused and cast zirconium silicate. These artificial zircon beads are of larger size than naturally occurring zircon sand. More particularly however, it has been found that sodium attacks zircon beads but not zircon sand. Experiments with exposure testing of zircon beads to sodium show attack and fracture of the beads occurs after immersion, e.g. for one month in sodium at 350° C. Microscopic examination of zircon beads shows them to have a composite two-phase structure, resulting from the fusion casting method of production. It is believed that the sodium attacks the silica-rich matrix of the beads resulting in fracture. Zircon sand, on the other hand, is not degraded by exposure to sodium under similar conditions.

The invention includes within its scope a sodium sulphur cell comprising a tube of solid electrolyte material separating sulphur/polysulphides in a cathodic region from liquid sodium in an annulus adjacent to one surface of the electrolyte tube and wherein said annulus contains zircon sand forming a filler and capillary system for drawing liquid sodium from a sodium reservoir over said one surface of the tube. The annulus may lie around the outside of the electrolyte tube and, at one end, may be open to a sodium reservoir located axially beyond one end of the electrolyte tube.

Preferably the zircon sand lies adjacent the whole of the surface area of the electrolyte tube exposed to sodium in the anodic region.

The zircon sand is chemically and electrochemically inert with respect to the sodium and the electrolyte. The particles of sand form a filler in the anodic region thus limiting the quantity of sodium in that region and they also form a wick or capillary system to ensure that the electrolyte tube is wetted by sodium. Zircon sand is readily available as small particles of 50 to 200 microns size which are of generally spherical form and which pack closely, typically having a bulk density of 2.95 gm/cc with about 34% voids. Thus a high packing density can be obtained, even in a narrow annulus of a tubular cell.

A further advantage of zircon sand lies in its surface properties; these are such that the material is free-flowing in bulk. The surface moreover is readily wetted by liquid sodium. It is thus readily possible to fill a narrow annular region with the zircon sand, without voids due to bridging, and thereby to obtain a high packing density. Because the material is readily wetted by sodium, the anodic region around the surface of the electrolyte is a region which can readily be filled with liquid sodium; the sodium can readily flow into this region from the reservoir and vice-versa on charge and discharge of the cell and the wicking action is efficient, ensuring that the electrolyte surface is maintained covered by the sodium.

In a sodium sulphur cell, as previously explained, one of the main purposes of the filler material is to help minimise the quantity of sodium closely adjacent the surface of the electrolyte whilst allowing adequate flow for the desired electrochemical operation of the cell. In a tubular cell, conveniently sodium is arranged in a narrow annulus adjacent the electrolyte surface, either inside or outside the electrolyte tube, and the bulk of the sodium is housed in a reservoir, displaced axially from the electrolyte tube at one end thereof. Provision has to be made for the sodium to flow from the reservoir to the annulus; this may be under gravity or by wicking, e.g. in a capillary system or by using gas pressure. As a further safety precaution, it is known to provide a flow restrictor, e.g. a plate within one or a few fine holes, between the reservoir and the annulus so thereby to limit flow of sodium into the annulus. In a cell having a steel housing with the sodium annulus outside the electrolyte tube between that tube and the housing, such a plate may be a steel plate welded to the housing.

It is preferred in the cell described above using zircon sand as a filler in a sodium annulus, to provide a reservoir displaced axially beyond one end of the electrolyte tube and to provide, between the reservoir and the sodium annulus, separator means comprising a filter of compressed metal mesh or restrictor plate as previously described. Such mesh filters are known in themselves and are formed of a very loose metal mesh which is compressed into a compact structure. The mesh, for the present purposes, may be formed of steel wire or aluminium wire. Such separator means segregate the filter material from the bulk sodium in the reservoir and provide support and compaction for the filler material.

Such a separator means finds use in sodium sulphur or other cells more generally using any granular or powder filler in a liquid alkali annulus. Thus the invention furthermore includes within its scope an electrochemical cell having a solid electrolyte tube separating a cathodic reactant inside the tube from a liquid alkali metal in an annular region between the electrolyte tube and a housing surrounding the electrolyte tube, the electrolyte tube being closed at one end and the housing containing a reservoir for the alkali metal disposed in the housing axially beyond the closed end of the electrolyte tube, wherein a particulate filler is provided in said annular region and wherein there is provided a separator means extending across the housing to retain the filler in the annular region, the separator means comprising a perforated plate or a filter of compressed metal mesh. Preferably the mesh is formed of steel or aluminium wire. A separator plate would be welded in place but a mesh filter may conveniently be secured in position by dimpling the housing to form one or more inwardly extending projections and/or by the use of a clip or clips, e.g. a C-spring located adjacent one end of the filter.

DESCRIPTION OF THE PREFERRED EMBODIMENT

Figure 1:
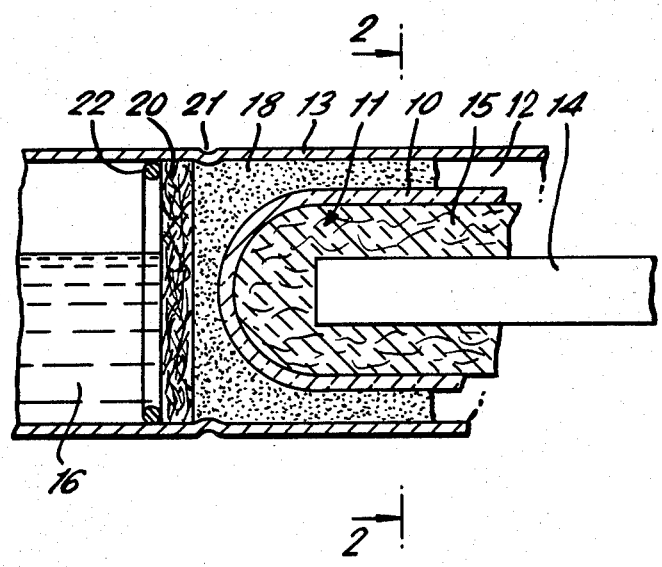
FIG. 1 shows diagrammatically part of a tubular sodium-sulphur cell in longitudinal section constituting one embodiment of the invention.

Referring to the drawings, there is shown diagrammatically a sodium-sulphur cell having an electrolyte tube 10 of beta-alumina closed at one end and separating a cathodic region 11 inside the tube 10 from an annular anodic region 12 between the tube 10 and an outer cylindrical steel housing 13. The cathodic region 11 includes an axially extending cathode current collector 14 and a fibre matrix 15, typically formed of graphite fibres, which matrix is impregnated with sulphur/sodium polysulphides constituting the cathodic reactant, the fibre matrix 15 extending between the inner surface of the electrolyte tube 10 and the cathode current collector 14.

The present invention is concerned more particularly with the anodic region 12 which contains liquid sodium. This sodium has to cover the outer surface of the electrolyte tube 10, the sodium passing, as sodium ions, through the electrolyte into the cathode region on discharge of the cell and passing in the reverse direction on charging of the cell. The bulk of the sodium is housed in a reservoir 16 spaced, in the axial direction, from the electrolyte tube. The sodium in the reservoir may be pressurised with an inert gas such as nitrogen if the cell is to be used vertically with the electrolyte tube above the reservoir. If the cell is to be used horizontally, gravity and capillary attraction may be sufficient to ensure that the surface of the electrolyte is wetted with sodium. The anodic region 12 is open, at one end of this reservoir; restrictor means are provided in the flow path between the reservoir and the annular region 12 to limit the flow rate. The whole region 12 is filled with zircon sand 18 so that the sand lies against the whole surface of the electrolyte tube to be exposed to the sodium. This sand comprises substantially spherical particles of diameter in the range of 50 to 200 microns. With such sand, a packing density can be obtained filling over 60% of the volume. This sand serves to reduce the quantity of sodium in the annular region 12 and also forms a capillary system for maintaining the surface of the electrolyte wetted with sodium. The sand furthermore, in the event of any breach of the electrolyte tube, limits the rate of flow of sodium towards the neighbourhood of the breach.

The zircon sand substantially fills the annular region around the outside of the electrolyte tube, lying adjacent to the whole surface of that tube which is to be exposed to sodium. The sand forms a capillary or wicking system to keep this surface of the electrolyte tube wetted with sodium. To hold the sand in position, preventing it passing into the sodium reservoir 16, there is provided a separator 20 comprising a cylindrical filter element of compressed metal wire mesh, conveniently formed of fine steel or aluminium wire.

The metal mesh separator is resilient and bears against the inside surface of the housing. It need not therefore be sealed to the housing. In the construction shown in FIG. 1, the separator 20 is located in position by an indentation 21 in the wall of the housing 13, to form an internal projection restraining the separator 20 against upward movement. Downward movement is prevented by a C-spring 22 forming a clip sprung into the housing after the separator has been inserted. Instead of a metal mesh, a restrictor plate may be used, e.g. a metal plate with a few small holes at the periphery to permit of flow of sodium at a limited rate from the reservoir into the annulus.

Figure 2:
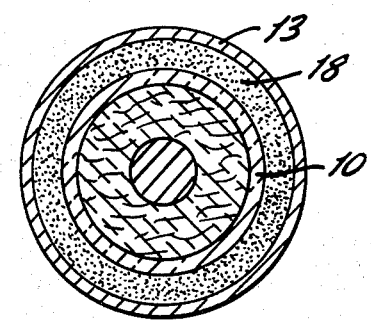
FIG. 2 is a transverse section through the cell of FIG. 1 along the line 2—2.

FIGS. 1 and 2 illustrate a "central sulphur" cell in which the cathodic reactant lies inside an electrolyte tube. The zircon sand filler may equally be used in a central sodium cell in which the sodium is inside the electrolyte tube and the cathodic reactant is outside the tube. In a central sodium cell, an anode current collector, conveniently a rod of circular section, may be located axially within the electrolyte tube, to leave an annular region between the collector and tube surface, which annular region is filled with zircon sand. This annular region, at one end, is open to a sodium reservoir located at one end of the cell.

In some cases in a central sodium cell, it may be more convenient to use the sodium as the current collector and the electrolyte tube would be completely filled with filler material or a central rod may be used as a displacer, e.g. a rod of non-conducting material.

I claim:

1. An electrochemical cell having a cathodic reactant, an anodic region containing liquid sodium, a solid electrolyte separating the cathodic reactant from the liquid sodium in the anodic region with the sodium adjacent a surface of the electrolyte and zircon sand in said anodic region.

2. A sodium sulphur cell comprising a tube of solid electrolyte material, sulphur/sodium polysulphides in a cathodic region, a reservoir containing liquid sodium, an annulus adjacent to one surface of the electrolyte tube, said tube separating the annulus from the sulphur/sodium polysulphides, and zircon sand in said annulus forming a filler and capillary system for drawing liquid sodium from the sodium reservoir over said one surface of the tube.

3. A cell as claimed in claim 2 wherein said annulus lies around the outside of the electrolyte tube between that tube and a housing.

4. A cell as claimed in claim 2 wherein the sodium reservoir is located axially beyond one end of the electrolyte tube and wherein said annulus is open at one end to said reservoir.

5. A cell as claimed in claim 1 wherein the zircon sand comprises particles in the size range of 50 to 200 microns.

6. A cell as claimed in claim 1 wherein the sand particles are of substantially uniform size.

7. A cell as claimed in claim 1 wherein the sand particles are substantially spherical.

8. A cell as claimed in claim 2 wherein a separator is provided between the annulus and the sodium reservoir, sand separator comprising a metal plate with small holes at the periphery.

9. A cell as claimed in claim 2 wherein a separator is provided between the annulus and the sodium reservoir, said separator comprising a filter of compressed metal mesh.

10. A cell as claimed in claim 9 wherein the filter is formed of steel or aluminium wire.

11. An electrochemical cell having a housing, a cathodic reactant, a liquid alkali metal, a solid electrolyte tube separating the cathodic reactant inside the tube from the liquid alkali metal in an annular region between the electrolyte tube and the housing, said housing surrounding the electrolyte tube, the electrolyte tube being closed at one end and the housing containing a reservoir from the alkali metal disposed in the housing axially beyond the closed end of the electrolyte tue, zircon sand in said annular region and separator means extending across the housing to retain the zircon sand in the annular region, the separator means comprising a metal plate with small holes at the periphery.

12. An electrochemical cell having a housing, a cathodic reactant, a liquid alkali metal, a solid electrolyte tube separating the cathodic reactant inside the tube from the liquid alkali metal in an annular region between the electrolyte tube and the housing, said housing surrounding the electrolyte tube, the electrolyte tube being closed at one end and the housing containing a reservoir for the alkali metal disposed in the housing axially beyond the closed end of the electrolyte tube, zircon sand in said annular region and separator means extending across the housing to retain the zircon sand in the annular region, the separator means comprising a filter of compressed metal mesh.

13. A cell as claimed in claim 12 wherein the alkali metal is sodium and the separator means is formed of steel wire.

14. A cell as claimed in claim 12 wherein the alkali metal is sodium and the separator means is formed of aluminium wire.

* * * * *